March 15, 1932.   T. B. HUESTIS   1,849,928
APPARATUS FOR CUTTING RUBBER
Filed Dec. 15, 1928
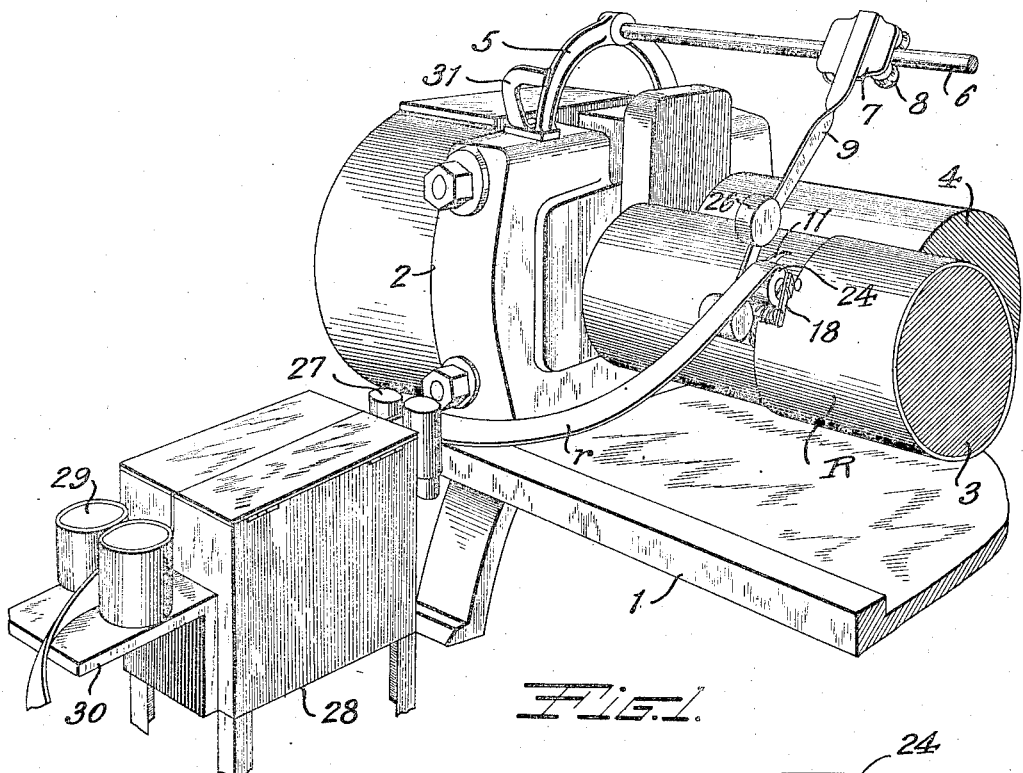
Fig. 1.
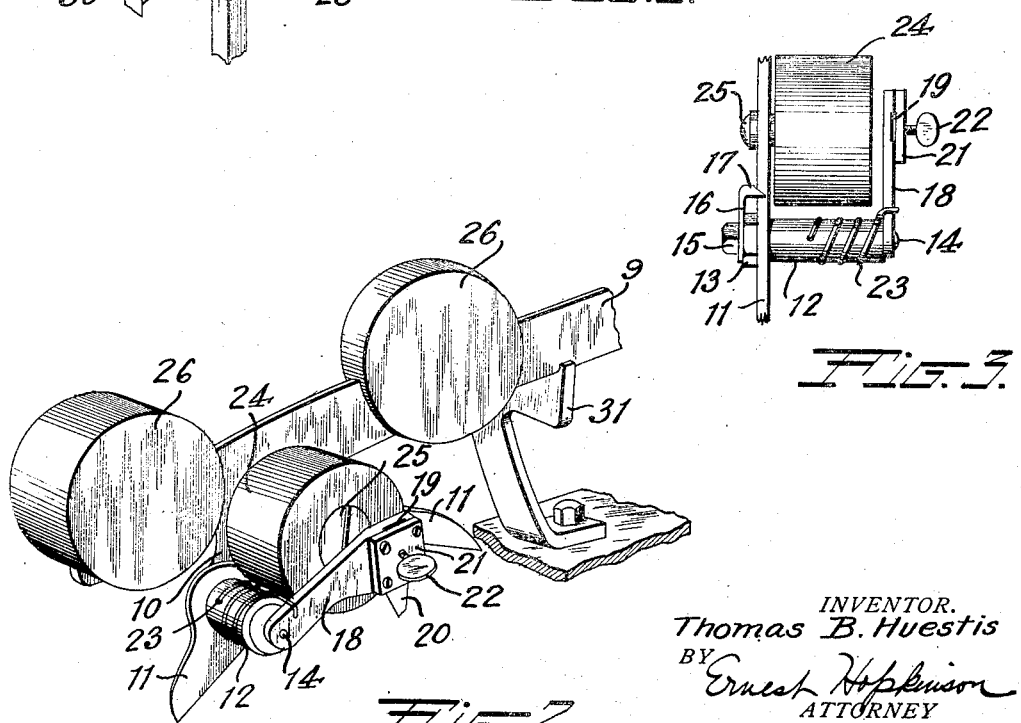
Fig. 3.
Fig. 2.
INVENTOR.
Thomas B. Huestis
BY Ernest Hopkinson
ATTORNEY Patented Mar. 15, 1932

1,849,928

UNITED STATES PATENT OFFICE

THOMAS B. HUESTIS, OF BRISTOL, RHODE ISLAND, ASSIGNOR TO NATIONAL INDIA RUBBER COMPANY, OF BRISTOL, RHODE ISLAND, A CORPORATION OF RHODE ISLAND

APPARATUS FOR CUTTING RUBBER

Application filed December 15, 1928. Serial No. 326,192.

This invention relates to a device for cutting strips of rubber from rubber on the roll of a rubber mill and for applying soapstone or similar powdered material to the strip as it leaves the mill.

The objects of this invention are to provide a device mounted on a mill for cutting rubber strips therefrom; to provide a device mounted on a mill for automatically cutting a strip of rubber from the entire length of a mill roll; to provide a device for cutting a strip of constant predetermined width from rubber on a mill, to provide a device for cutting and conducting away a strip of rubber from rubber on a rubber mill and to provide a device for cutting a strip of rubber from a rubber mill in combination with a device for applying soapstone or similar powdered material to the strip as it leaves the mill.

With the particular device herein disclosed in mind and without intending to limit the invention more than is required by the prior art, my invention consists of a knife mounted so as to engage the surface of a mill roll at an inclination to the axis of the roll, which knife is intended to cut a helical strip of rubber from rubber on the roll and due to its inclination to be moved across the roll during the cutting so as to sever a continuous strip of constant width from the roll. Means are provided for supplying soapstone to the strip as it leaves the mill.

For an understanding of my invention reference should be had to the following detailed description and the accompanying drawings in which:

Fig. 1 is a perspective view of my invention mounted upon a rubber mill and the soapstone applying apparatus in combination therewith.

Fig. 2 is an enlarged detailed perspective view of the knife and its support.

Fig. 3 is a detailed view of the knife support.

Referring to the drawings there is shown at 1 the bed of a rolling mill having upright end standards 2, one only of which is shown. In the standards are rotatedly mounted the mill rolls 3 and 4. This construction of mill is a conventional one.

In carrying out my invention I fix brackets 5 on standards 2 by bolts or other suitable means. A rod 6 that serves as a track extends between the brackets 5. Upon the rod 6 there is mounted a plate 7 on which are rotatedly mounted the concaved wheels 8. The wheels 8 engage the rod 6 to provide for the movement of the plate along the rod. A bar 9 is mounted at one end upon the plate 7 in any suitable manner and has at its opposite end a projection 10. The projection 10 carries a guide 11 which is secured thereto by bolts or in any other suitable manner. A hollow bushing 12 having a threaded end is carried in an aperture in the guide 11 and is secured in position by any suitable means such as the nut 13. A pin 14 extends through the hollow bushing 12 and is rotatable therein, the pin 14 being held in position by suitable means such as the nut 15 which also serves to hold the stop 16 on one end of the pin 14. The stop 16 has a projecting finger 17 which extends over the top edge of the guide 11 so as to contact therewith upon rotation of the pin 14 so as to limit the rotation of the pin in a clockwise direction, looking at Fig. 2. On the other end of the pin 14 is rigidly mounted the arm 18 which in its free end has a slot 19 adapted to receive the knife blade 20. A block 21 is attached to the end of the arm 18 by screws or other suitable means and carries a thumb screw 22 which may be tightened so as to hold the knife blade 20 in position in the slide 19. A spiral spring 23 is disposed about the hollow bushing 12, one end of the spring being fastended to the bushing and the other end engaging the arm 18 so as to resiliently urge the arm 18 and knife blade 20 toward the mill roll. A roller 24 is rotatably mounted on the guide 11 by means of the bolt and nut 25. Weights 26 are carried on the end of the bar 9 which serve to urge the knife towards the mill roll.

The knife blade 20 is so positioned that it tends to cut in a plane slightly inclined from the perpendicular to the axis of the mill roll. This inclination of the knife blade may be effected either by shaping the bar 9 or by mounting the arm 18 on the guide 11 so as to give the blade the desired direction.

In the operation of the device so far described rubber R is fed to the mill and allowed to warm up so as to form a continuous sheet about the front roll 3. The knife and its carriage is then positioned adjacent the left end of the roll and a knife brought into contact with the rubber. Due to the rotation of the rubber and roll past the knife edge the knife cuts a strip from the rubber the width of which is limited by the guide plate 11. The guide plate 11 is so shaped along its lower edge as to fit the surface of the mill roll and in operation the guide is placed with its side against the edge of the rubber on the roll so that the width of the strip is determined by the distance between the knife and the guide place 11. Due to the inclination of the knife 20 and the roller 24, they and the carriage which is movably mounted on the track 6, tend to move to the right, as viewed in Fig. 1. Due to this tendency of the knife and the roller 24 to move to the right, the knife and its carriage follow the edge of the rubber from left to right across the roll, thereby cutting a continuous helical strip from the rubber on the roll. This strip, as it leaves the roll 3, passes over the roller 24 which serves to separate the strip from the roller and conduct it away.

In the operation as above described, the knife blade is held with sufficient force against the face of the mill roll to cut the rubber due to the force of the weights 26 acting upon the knife resiliently through the spring 23. The guide 11 not only serves to limit the width of the strips but it also determines the proximity of approach of the knife and its carrier towards the mill roll inasmuch as the lower edge of the guide rides upon the roll.

The rubber strip r as it leaves the cutting device, passes between the pair of rollers 27 suitably mounted upon a soapstone applying device 28. As the rubber strip r passes the rollers 27 it enters the device 28 through a slot in the side wall thereof and during its passage therethrough a soapstone or other powder is applied by mechanical agitators or in any other suitable fashion. The rubber strip leaves the device 28 through a slot in the side wall opposite from the entrance slot and passes between a pair of rolls 29 which serve to draw the strip through the soapstone applying device. The rollers 29 are driven from a suitable source of power (not shown) and are rotatably mounted upon the bracket 30 carried by the device 28.

A bracket 31 is attached to end standard 2 and is adapted to support the cutter when not in use.

The particular form of my invention hereing disclosed is peculiarly adaptable for use in connection with machinery for applying insulation to wire. In the usual practice it has been customary manually to cut strips of rubber from a rubber mill and immediately cover the same with soapstone powder so as to prevent the unvulcanized rubber from sticking when the various parts of the rubber strip come into contact as the same is folded for temporary storage. The soapstoned strip is then fed into an extruding device into which is also fed the wire to be covered. The extruding device operates to apply the rubber about the wire to form an insulating cover. In order to reduce the time and amount of attention required from the operator I have arranged the automatic cutting device herein disclosed in combination with the soapstone applying device so that one operator after having fed the rubber to the rubber mill and set the cutting device into operation may allow the cutting device and soapstone device to carry out its work automatically, the rubber strip being fed from the soapstoning device directly into the extruding machine if desired. By this combination of devices the time required of the operator is greatly reduced so that he may operate more mills, the strip is of more uniform width than heretofore obtained, the operation is a continuous one requiring less time and space, producing a better result with less cost thereby effecting the insulation of wire in a more economical way than heretofore possible.

While this device has been described as being peculiarly adapted for use with an extruding mill, its uses are not limited thereto inasmuch as rubber strip may be cut in the manner described and may be soapstoned in the manner described for any purpose whatever requiring rubber strips.

The machine may be varied in any of its details such as arranging the knife and its support so as to cut a wider strip of rubber, if desired, the width of the strip being determined by the distance between the guide 11 and the knife 20 and by the inclination of the knife with respect to the axis of the roll. Other modifications in the details of the apparatus, will be obvious to one skilled in the art and all such modifications are contemplated as coming within the scope of my invention which is defined by the following claims.

Having thus described my invention what I claim and desire to protect by Letters Patent is:

1. A strip cutter for rubber mills having rolls, comprising a blade and slidable means to support the blade in contact with one of the rolls of the mill and at an inclination to the axis of the roll whereby the blade is moved longitudinally of the roll by its cutting action.

2. A strip cutter for rubber mills having rolls comprising a frame mounted for movement parallel to the axis of the rolls of the mill, a knife, a knife support carried by the frame and arranged to support said knife in contact with the surface of a roll and at an inclination to the axis thereof whereby the knife is moved longitudinally of the roll by its cutting action.

3. A strip cutter for rubber mills having rolls comprising a frame mounted for movement parallel to the axis of the rolls of the mill, a knife, a knife support carried by the frame and arranged to support said knife in contact with the surface of a roll and at an inclination to the axis thereof, whereby the knife is moved longitudinally of the roll by its cutting action, and resilient means for pressing the knife against the roll.

4. A strip cutter for rubber mills having rolls comprising a frame mounted for movement parallel to the axis of the rolls of the mill, a knife, a knife support carried by the frame and arranged to support said knife in contact with the surface of a roll and at an inclination to the axis thereof, whereby the knife is moved longitudinally of the roll by its cutting action, and a guide carried by the knife support for limiting the width of the strip.

5. In a strip cutting apparatus for rubber mills having rolls, in combination, a frame mounted for movement parallel to the axis of the rolls, a knife, means carried by said frame to support said knife against the surface of a roll at an inclination to the axis thereof, a guide associated with said means, a roller mounted on said guide adjacent said roll and adapted to separate a cut strip of rubber therefrom.

Signed at Bristol, county of Bristol, State of Rhode Island, this 13th day of December, 1928.

THOMAS B. HUESTIS.